US008443451B2

(12) United States Patent
Madathilparambil George et al.

(10) Patent No.: US 8,443,451 B2
(45) Date of Patent: *May 14, 2013

(54) MANUALLY CONTROLLED APPLICATION SECURITY ENVIRONMENTS

(76) Inventors: George Madathilparambil George, Hyderabad (IN); Nikhil George, Hyderabad (IN)

( * ) Notice: Subject to any disclaimer, the term of this patent is extended or adjusted under 35 U.S.C. 154(b) by 1191 days.

This patent is subject to a terminal disclaimer.

(21) Appl. No.: 12/079,369

(22) Filed: Mar. 27, 2008

(65) Prior Publication Data

US 2009/0249435 A1    Oct. 1, 2009

(51) Int. Cl.
*G06F 7/04*    (2006.01)
*G06F 17/30*   (2006.01)
*H04N 7/16*    (2006.01)

(52) U.S. Cl.
USPC .......................................................... 726/27

(58) Field of Classification Search .................. 726/1–2, 726/16–17, 21, 26–29; 713/164–167, 193–194; 711/154, 163
See application file for complete search history.

(56) References Cited

U.S. PATENT DOCUMENTS

| | | | |
|---|---|---|---|
| 6,330,648 B1 | 12/2001 | Wambach et al. | |
| 7,191,469 B2* | 3/2007 | Erlingsson | 726/27 |
| 7,302,698 B1* | 11/2007 | Proudler et al. | 726/2 |
| 7,523,281 B2 | 4/2009 | Madathilparambil George et al. | |
| 7,624,424 B2* | 11/2009 | Morita et al. | 726/1 |
| 2005/0120242 A1* | 6/2005 | Mayer et al. | 713/201 |
| 2006/0117156 A1 | 6/2006 | Chai et al. | |
| 2008/0059740 A1 | 3/2008 | Madathilparambil George et al. | |
| 2008/0066183 A1 | 3/2008 | Madathilparambil George et al. | |
| 2008/0104207 A1* | 5/2008 | Pulkkinen et al. | 709/220 |
| 2010/0005531 A1* | 1/2010 | Largman et al. | 726/24 |

* cited by examiner

*Primary Examiner* — Philip Chea
*Assistant Examiner* — Trong Nguyen

(57) ABSTRACT

Computer protection is weak with the methods currently available and there are risks of malicious users getting access to computers, corrupting important data, including system data. We are proposing a method for improving access protection, more particularly, by adding a device that will enable or disable protection for applications as required. The device supports one or more users, one or more user groups, none or one or more Application Security Environments for each user or user group and one or more states for each Application Security Environment. The state of the hardware is manually controlled by the users. Depending on the configuration, each hardware state corresponding to an Application Security Environment corresponds to a set of privileges for processes running in that Application Security Environment while that Application Security Environment is in that state.

32 Claims, 8 Drawing Sheets

US 8,443,451 B2

MANUALLY CONTROLLED APPLICATION SECURITY ENVIRONMENTS

BACKGROUND OF THE INVENTION

The present invention relates to creating one or more highly secure application security environments in computing systems. An Application Security Environment is an environment in which a user or a group of users can run one or more tasks or one or more processes or one or more applications and in which privileges of the tasks or processes or applications run by a user or a user group can be more constrained than the privileges of the user or the user group. An application could consist of one or more tasks or processes. A process could consist of one or more threads.

Current technologies provide protection using operating system software and a malicious program or user can get access as a privileged user with limited access restrictions and run programs on behalf of other users or read confidential user data or corrupt user data. It requires hardware support to provide complete protection for user data from malicious programs.

There are different methods for access control such as non-privileged users in UNIX or Windows operating systems who cannot execute privileged instructions or access all parts of volatile or non-volatile memories (storage). But a malicious program or user can sometimes exploit security weaknesses in an operating system, to get access as a privileged user. This will allow malicious users to impersonate privileged users and gain access to critical data belonging to other users or corrupt users' data. UNIX and Windows privileges also do not allow limiting privileges assigned to a privileged user.

High level of application protection is provided by Application Security Environments such as Solaris containers and HPUX Security Containers. Each container ideally has only a subset of the privileges and compromising security of most of the containers poses only a limited risk. However, when either the operating system security is compromised or when the security of a container that is used to create other containers is compromised, it will result in significant risk to both computer user's identity and data.

There is serious risk to users' data and users' identity when their laptops are stolen or when someone gains access to a user's computer in the user's absence.

There is serious risk to users' data and users' identity when a privileged user is malicious. The privileged user may create containers that compromises both user's identity and user's data.

There are many methods for protecting computer users and user data which do not require manual action for enabling and disabling protection; Such protections can be compromised by malicious privileged users or by malicious programs by emulating the required software behavior.

U.S. Pat. No. 6,330,648 illustrates a method of adding protection against malicious programs using a manually controlled hardware with two states. By default the protection is enabled and has a mechanism to manually switch off the protection. This invention will not be able to provide protection for portions of storage belonging to each Application Security Environment, as is possible using our invention. Another drawback of the invention is that the solution cannot be used with mass memories which are already manufactured.

U.S. Patent Application 20060117156 illustrates a method of adding protection for non-volatile memories against malicious programs using a manually controlled hardware with two or more states, but only two states are used for protection. One state has protection enabled and other state has protection disabled. This invention will not be able to provide protection for portions of storage belonging to each Application Security Environment, as is possible using our invention.

U.S. patent application Ser. Nos. 11/514807, 11/515619 and 11/519178 shows different manually controlled hardware solutions that protect data on mass-memories for each user. These patents propose dividing mass-memories into different areas and protecting these areas against malicious access. But these solutions can not provide fine grained protection for each Application Security Environment. The privileges get enabled at user level and if any of the programs that are run by the user is malicious when the state corresponding to a privileged user corresponds to low protection, it can cause serious risk to the user's data and user's identity.

FIG. 1 shows an example of a computer 101 with multiple users and multiple Application Security Environments each containing multiple processes. There are 3 Application Security Environments in the computer. Application Security Environment P 102 contains two processes A 105 and D 106. Application Security Environment Q 103 contains two processes C 107 and E 108. Application Security Environment R 104 contains two processes B 109 and F 110. The Application Security Environment P 102 and Q 103 are owned by User Y 111. The Application Security Environment R 104 is owned by User Group X 112.

BRIEF SUMMARY OF THE INVENTION

It is the object of the present invention to use a device which supports one or more Application Security Environments and supports one or more states for each Application Security Environment so that protection for Application Security Environment can be improved. The device may be implemented in hardware or as a combination of hardware and firmware. The device is referred to as the Application Security Environment Protection Device or the ASEPDevice. The state of an Application Security Environment is referred to as the Application Security Environment State. Each Application Security Environment is owned by a user or a group of users and only the owners of an Application Security Environment can run processes/tasks in that Application Security Environment. The privileges of the processes/tasks run in an Application Security Environment will be a subset of the privileges of the the user or the user group who owns of that Application Security Environment. The privileges of the processes/tasks run in an Application Security Environment will depend on the state of the Application Security Environment. The user or members of the user group who own an Application Security Environment are referred to as Application Security Environment Owners or ASEOs. Some users are grouped to create user groups. Each state of an Application Security Environment corresponds to or maps to a set of privileges that the processes/tasks/threads running in that Application Security Environment have when that Application Security Environment is in that state. This set of privileges corresponding to or mapped to an Application Security Environment State is a subset of the privileges of the corresponding ASEOs. This mapping from a state of an Application Security Environment to a set of privileges that the processes/tasks/threads running in that Application Security Environment have when that Application Security Environment is in that state, is referred to as Application Security Environment State Mapping. Preferably, it requires a manual action on an ASEPDevice to:
  i. Create or delete a user or
  ii. Create or delete a user group or
  iii. Add a user to or remove a user from a user group or
  iv. Create or delete an Application Security Environment or
  v. Create or delete an Application Security Environment State or
  vi. Change the state corresponding to an Application Security Environment or
  vii. Create or modify or delete an Application Security Environment State Mapping or
  viii. Divide mass-memories into Regions which can be protected by ASEPDevices or
  ix. Assign privileges to users and user groups including access to Regions of mass-memories.

These operations will be completed only if the user who makes the manual action has the required privileges. We refer to the manual action on the ASEPDevice to initiate these operations as Application Security Environment Protection Manual Action or ASEPManualAction.

The ASEPManualAction on an ASEPDevice may be pressing one or more buttons and/or toggling the position of one or more switches and/or turning a wheel and/or changing one or more jumper positions and/or any other manual action accepted by the ASEPDevice.

The ASEPDevice interacts with software running on the computer to which it is attached to perform these operations. This software is referred to as Application Security Environment Protection Software or ASEPSoftware.

As file system permissions and ownership are based on user and user group, the protection provided for file operations will be based on user and user group. The proposed invention does not handle protection for file system operations. All other privileged operations are handled by the proposed invention.

An ASEPDevice can be used for enforcing privileges for processes/tasks/threads in an Application Security Environment when the processes/tasks/threads do privileged operations such as executing a privileged instruction, making a privileged system call, calling a privileged function, accessing an area or a Region of mass-memories such as hard disc, DVD, etc. Privileged instructions include instructions to do an input/output operation to a device attached to the computer.

To protect data on mass-memories using an ASEPDevice, the mass-memories are divided into Regions or areas as proposed in U.S. patent applications Ser. Nos. 11/514807, 11/515619 and 11/519178. Read and write access to each Region is allowed or denied for each Application Security Environment based on the set of permissions that is mapped to the current state of the Application Security Environment.

The software, firmware and hardware that implement access protection fail a privileged operation which does not meet the access restrictions corresponding to the current state of the Application Security Environment from which the privileged operation is initiated. The software, firmware and hardware which implement access protection by checking the Application Security Environment State Mapping for the current state of an Application Security Environment is called Application Security Environment Protection Implementers or ASEPImplementers.

Preferably, part or all of the configuration required for enforcing protection based on the proposed invention must be kept in an ASEPDevice. These include configuration for users, user groups, Application Security Environments, Application Security Environment States and Application Security Environment State Mappings.

DETAILED DESCRIPTION OF THE INVENTION

Figure 1:
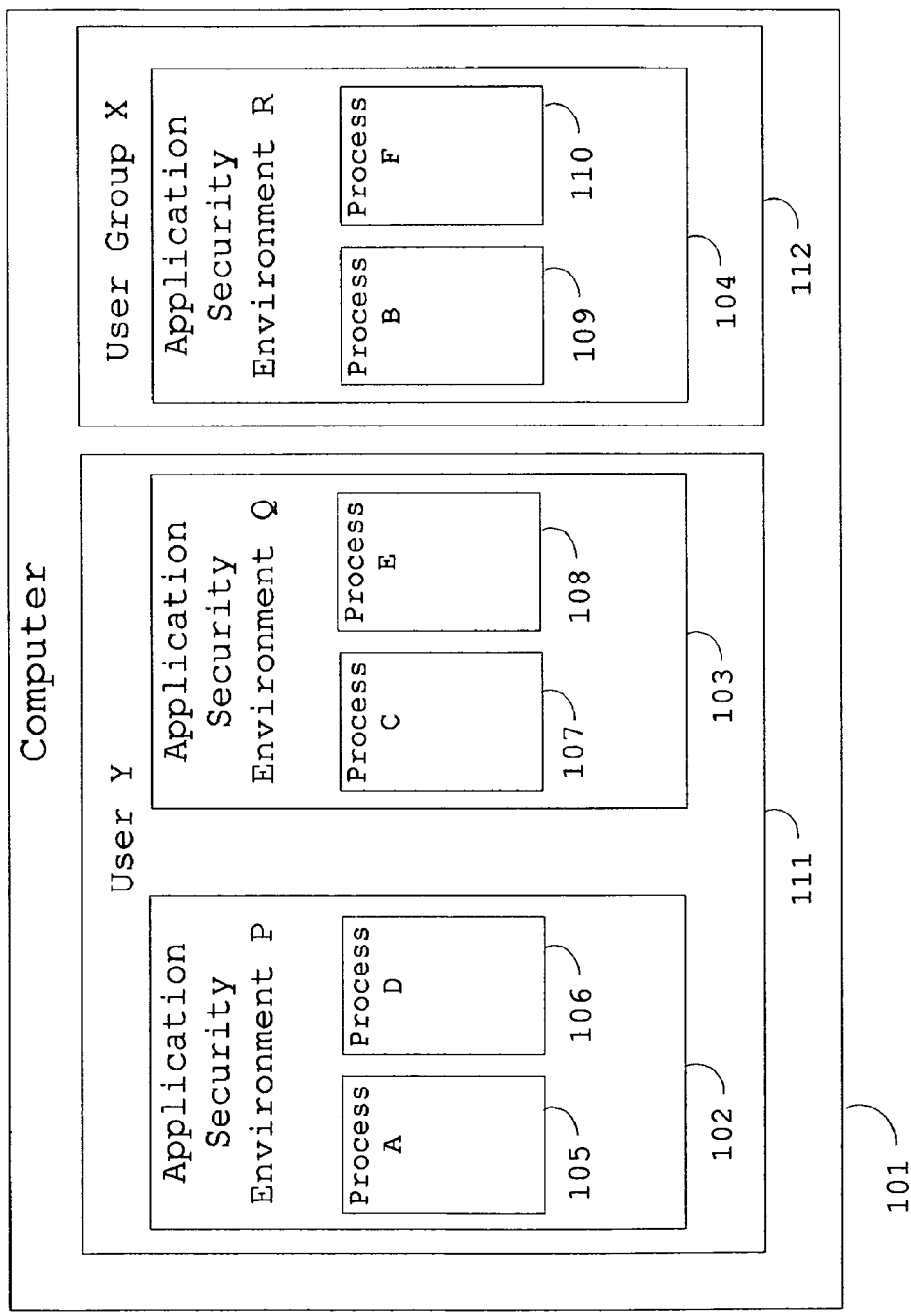
FIG. 1 illustrates a computer system with different Application Security Environments each owned by a user or a user group.

According to the invention, one or more ASEPDevices or ASEPSoftware or a combination of one or more ASEPDevices and ASEPSoftware allow:
  i. A privileged user to create or delete users;
  ii. A privileged user to create or delete user groups;
  iii. A privileged user to add users to or remove users from a user group;
  iv. A privileged user to assign privileges for users or user groups;
  v. A user to create or delete Application Security Environments owned by that user;
  vi. All or some members of a user group to create or delete Application Security Environments owned by that user group;
  vii. Some privileged users to create or delete Application Security Environments owned by a user or by a user group;
  viii. A user to create or delete Application Security Environment States for an Application Security Environment owned by that user;
  ix. All or some members of a user group to create or delete Application Security Environment States for an Application Security Environment owned by that user group;
  x. Some privileged users to create or delete Application Security Environment States for an Application Security Environment;
  xi. A user to create or modify or delete an Application Security Environment State Mapping for an Application Security Environment State for an Application Security Environment owned by that user;
  xii. All or some members of a user group to create or modify or delete an Application Security Environment State Mapping for an Application Security Environment State for an Application Security Environment owned by that user group;

xiii. Some privileged users to create or modify or delete an Application Security Environment State Mapping for an Application Security Environment State for an Application Security Environment.

A user or user group can own none or one or more Application Security Environments.

An Application Security Environment can have one or more states. This allows privileges to be enabled for an Application Security Environment only when one or more Applications need to be run in an Application Security Environment. This significantly enhances the security of the computing systems. Similarly, this allows privileges to enabled based on the requirements of the application being run in an Application Security Environment.

The state of an Application Security Environment can be changed only using an ASEPDevice.

Privileges of an Application Security Environment owned by an ASEO must not exceed the privileges of the corresponding ASEO. Preferably, only an ASEO of an Application Security Environment should be allowed to configure access restrictions for that Application Security Environment corresponding to different states of that Application Security Environment.

The privileges assigned to different users or groups are not mutually exclusive.

When an Application Security Environment State Mapping is created, an ASEPSoftware or an ASEPDevice verifies whether the privileges corresponding to the Application Security Environment State exceed the privileges of the user or user group who owns that Application Security Environment. Preferably, if the privileges exceed the privileges of the ASEOs, the Application Security Environment State Mapping is discarded and the user who tried to create the mapping gets an error. Optionally, the privileges corresponding to an Application Security Environment State that exceed the privileges of the user or user group who owns the Application Security Environment are discarded and the rest of the mapping is allowed.

The configuration used by ASEPDevices and ASEPSoftware contains:
  i. The list of users;
  ii. The list of user groups;
  iii. The list of users in each user group;
  iv. The set of privileges each user or each user group has;
  v. The list of Application Security Environments for each user and user group;
  vi. The list of states for each Application Security Environment;
  vii. The list of Regions of mass-memories which are protected by ASEPDevices;
  viii. The Application Security Environment State Mapping for each Application Security Environment State;

The configuration may be stored in one or more ASEPDevices or one or more other devices which are attached to or are part of the computer. The device attached to the computer storing this configuration may be a mass-memory. Optionally, the configuration could be distributed among these devices. Optionally, two or more copies of the configuration could be on these devices.

Preferably, the configuration must be kept in ASEPDevices in registers/memory not writable by a computer and updates to the configuration must be allowed only through ASEPManualAction.

Optionally, writes and reads of the configuration must be protected by one or more ASEPDevices.

If the configuration is kept in a Region of a mass-memory then preferably, that Region of mass memory must be protected by an ASEPDevice and ASEPImplementers.

The verification performed by an ASEPImplementer to verify whether a process/task in an Application Security Environment can do a privileged operation may involve both reading registers/memory of an ASEPDevice to fetch the current state of the Application Security Environment and verification by the ASEPImplementer against the configuration. If the configuration is stored in an ASEPDevice, the ASEPImplementer can verify whether an operation is permitted by reading the ASEPDevice registers/memory. If the configuration is stored in a separate device, the ASEPImplementer must fetch the current state of the Application Security Environment and the Application Security Environment State Mapping for that state to determine whether the operation is permitted in the current state of the Application Security Environment.

Reading and writing to the configuration are privileged operations. Preferably, when the configuration is not kept in ASEPDevices, read or write access to the configuration must be protected by one or more ASEPDevices and one or more ASEPImplementers.

Preferably, write access to the configuration of an Application Security Environment must be given only to the owners (ASEOs) of the Application Security Environment.

Only one or more privileged users can have privileges to create or delete users or to create or delete user groups or to add or remove users to or from a user group or to assign privileges to users or user groups. Hence, preferably, write access to the configuration containing the list of users, the list of user groups, list of users in each user group, privileges of each user or each user group must be given only to one or more privileged users.

If the configuration is not kept in ASEPDevices, only the privileged user's Application Security Environments must have write access to the portion of the configuration containing list of users, the list of user groups, the list of users in each user group and the privileges of users and user groups. In this case, preferably, the write access to this portion of the configuration must be protected by one or more ASEPImplementers.

If the configuration is not kept in ASEPDevices, preferably, only one or more Application Security Environments owned by a user should have write access to the configuration of each of the Application Security Environments owned by that user and the write access to that portion of the configuration must be protected by one or more ASEPImplementers.

When the configuration is not kept in ASEPDevices, preferably, only one or more Application Security Environments owned by a user group should have write access to the configuration of each of the Application Security Environments owned by that user group and the write access to that portion of the configuration must be protected by one or more ASEPImplementers.

Optionally, some privileged users may have write access to the configuration for other users or to the configurations for groups in which they are not members. In this case, all users need not have write access to configurations. In other words, if privileged users have privilege to create Application Security Environments and Application Security Environment States for other users, some users need not have the privilege to create Application Security Environments owned by themselves or owned by groups in which they are members.

When a user performs an ASEPManualAction, the operation corresponding to the ASEPManualAction and optionally, an identifier for the user who performed the ASEPManualAction are placed in registers/memory readable by the computer to which the ASEPDevice is attached, so that the computer can authenticate the user who performed the ASEPManualAction.

The ASEPImplementers should be capable of identifying the Application Security Environment which is attempting to execute a privileged instruction/function/system call or access portions of mass memories. Optionally, the operating system should be able to tag every privileged operation with the identifier of the Application Security Environment from which the privileged operation is being executed.

Sometimes, the ASEPSoftware needs to do cleanup and updates of data structures before an ASEPDevice is allowed to complete an operation requested by an ASEPManualAction. The cleanup may involve flushing dirty buffers in file system buffer caches and/or cleaning up data structures.

For example, the ASEPSoftware may need to flush dirty buffers in file system buffer caches and/or clean up data structures corresponding to old privileges as the new set of privileges may block access to these data for the Application Security Environment.

Figure 2:
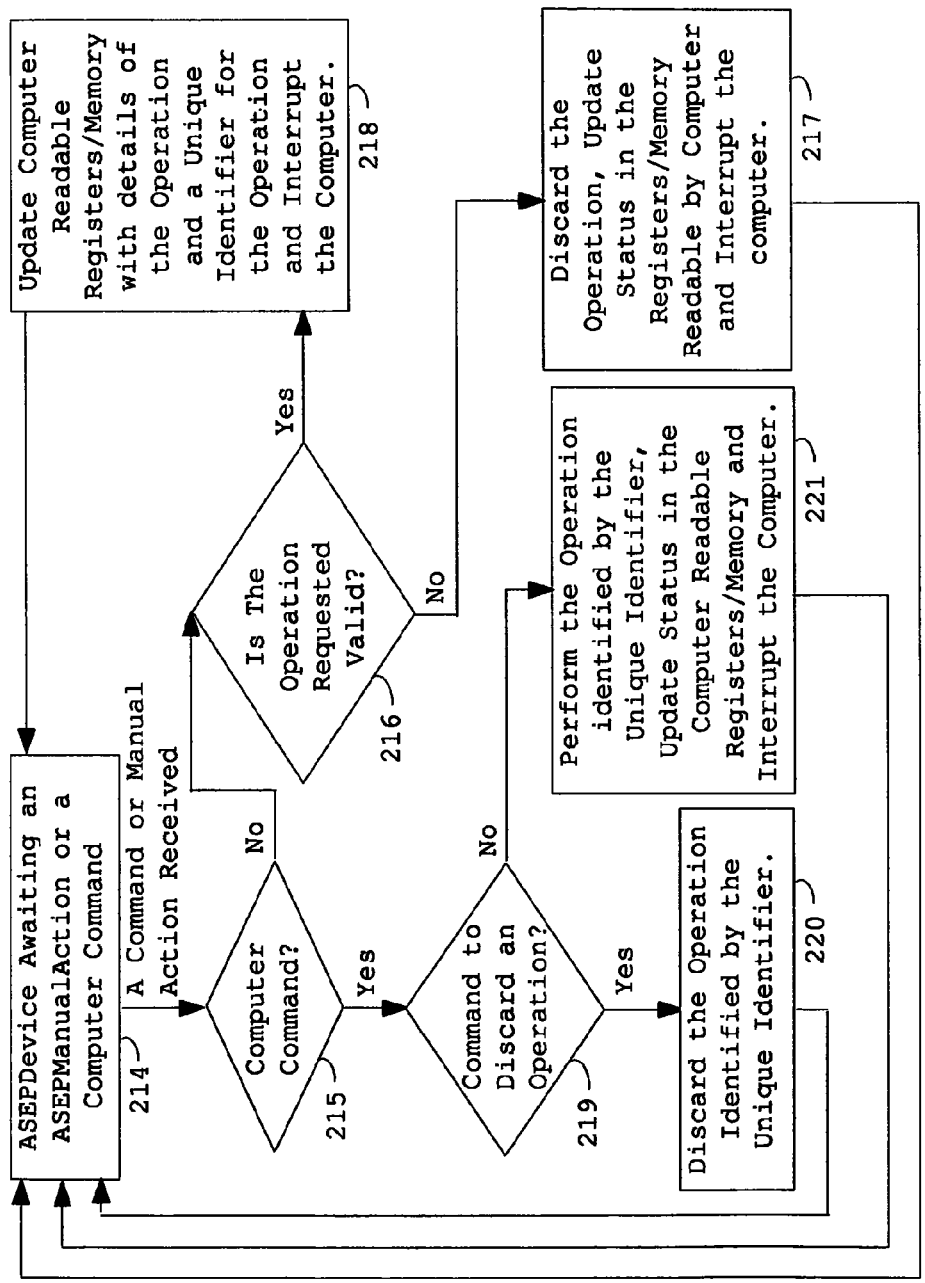
FIG. 2 illustrates an example of a state machine of an ASEPDevice that accepts ASEPManualAction.

FIG. 2 illustrates an example of a state machine of an ASEPDevice that accepts ASEPManualAction. The configuration is stored in this ASEPDevice and hence the firmware running on the ASEPDevice can determine whether an operation requested by an ASEPManualAction is valid or not. The ASEPDevice awaits 214 ASEPManualAction from a user or a Computer Command from the computer to which it is attached. The ASEPDevice checks the type of input 215, whether an ASEPManualAction or a Computer Command is received. When a user performs an ASEPManualAction, the ASEPDevice checks 216 whether the operation requested by the user by performing the ASEPManualAction is valid. If the operation requested is invalid 217, the ASEPDevice discards the operation and updates registers/memory readable (but not writable by the computer) by the computer to indicate the discarded operation and the reason for discarding the operation and interrupts the computer to which it is attached. If the operation is valid 218, ASEPDevice updates Computer Readable (but not computer writable) Registers/Memory with details of the operation requested through the ASEPManualAction and a unique identifier for the operation and interrupts the Computer to which it is attached. When a Computer Command is received, the ASEPDevice checks 219-whether the command is to discard or perform an operation. If the command is to discard an operation 220, the ASEPDevice discards the operation identified by the unique identifier. If the command is to perform an operation, the ASEPDevice performs 221 the operation identified by the unique identifier, updates registers/memory readable (but not writable) by the computer with the status and results of the operation and interrupts the computer to which it is attached.

If the configuration containing the Application Security Environment State Mappings is stored in the ASEPDevice and the operation requested by performing an ASEPManualAction is for Application Security Environment State change, the ASEPDevice can update registers/memory with new privileges that the processes/tasks running in the Application Security Environment have, as part of performing the operation.

The ASEPManualAction on an ASEPDevice may be pressing one or more buttons and/or toggling the position of one or more switches and/or turning a wheel and/or changing one or more jumper positions and/or any other ASEPManualAction supported by the ASEPDevice. Preferably, ASEPDevices have a display screen where the user can see the inputs the user has entered.

The ASEPDevice may use registers or memory readable by the computer to communicate the operation requested by an ASEPManualAction. Preferably, a computer should not be allowed to write into these registers or memory locations. This improves security as a malicious software will not be able to manipulate the operation requested by a user by performing an ASEPManualAction.

An ASEPManualAction can be for:
i. Creating or deleting one or more users or
ii. Creating or deleting one or more user groups or
iii. Creating or deleting one or more Application Security Environments owned by a user or a user group or
iv. Creating or deleting one or more Application Security Environment States for an Application Security Environment or
vii. Dividing mass-memories into Regions which can be protected by ASEPDevices or
viii. Assigning privileges to users and user groups including access to Regions of mass-memories or
v. Adding users to or removing users from a user group or
vi. Changing the state of an Application Security Environment or
ix. Creating or modifying or deleting Application Security Environment State Mappings for an Application Security Environment.

A privileged user can perform an ASEPManualAction to:
i. Create or delete one or more users or
ii. Create or delete one or more user groups or
iii. Add one or more users to or remove one or more users from a user group or
iv. Assign privileges to one or more users or user groups or
v. Create or delete one or more Application Security Environments owned by a user or a user groups or
vi. Create or delete one or more Application Security Environment States for an Application Security Environment or
vii. Change the state of an Application Security Environment owned by a user or a user groups or
viii. Divide mass-memories into Regions which can be protected by ASEPDevices or
ix. Create or modify or delete one or more Application Security Environment State Mappings for an Application Security Environment.

A user can perform an ASEPManualAction to:
i. Create or delete one or more Application Security Environments owned by that user or by one of that user's groups or
ii. Create or delete one or more Application Security Environment States for an Application Security Environment owned by that user or by one of that user's groups or
iii. Change the state of an Application Security Environment owned by that user or by one of that user's groups or
iv. Create or modify or delete one or more Application Security Environment State Mappings for an Application Security Environment owned by that user or by one of that user's groups.

Preferably, some of the actions for each of the operations can be done using an ASEPDevice and the rest of the actions for the same operation can be done using ASEPSoftware.

Optionally, some of these operations can be done using ASEPSoftware and rest of the operations can be done by doing ASEPManualAction on ASEPDevice.

Optionally, an ASEPManualAction specifies only one operation such as adding one user or deleting one user, etc.

Optionally, when an ASEPManualAction specifies more than one operation, none of these operations will be allowed to proceed if the Application Security Environment does not have the privilege to perform any of those operations. This is not a recommended option.

Optionally, when an ASEPManualAction specifies more than one operation, only those operations will not be allowed to proceed for which the Application Security Environment does not have the privilege to perform the operations. This is not a recommended option.

For rest of the description, it is assumed that an ASEPManualAction specifies only one operation; However, creating multiple users is considered a single operation.

When a new user or a new user group or a new Application Security Environment or a new Application Security Environment State is created, the ASEPDevice can allocate memory and create data structures for storing the corresponding information as part of performing the operation.

When a user or a user group or an Application Security Environment or an Application Security Environment State is deleted, the ASEPDevice can deallocate the corresponding memory and update the corresponding data structures as part of performing the operation.

When an Application Security Environment State Mapping is changed, the ASEPDevice can update internal data structures corresponding to that mapping and also update registers/memory containing the current set of privileges for the Application Security Environment based on its current state. The updates done by an ASEPDevice as part of performing an operation are implementation specific.

Invalid operations include adding a user to a non-existent user group, creating an Application Security Environment for a non-existent user or for a non-existent user group, creating a new state for a non-existent Application Security Environment, creating an Application Security Environment State Mapping for a non-existent Application Security Environment State, creating or modifying Application Security Environment State Mapping such that the privileges corresponding to an Application Security Environment State exceeds the privileges of the corresponding ASEOs, etc.

The ability of an ASEPDevice to detect invalid operations is implementation specific. Optionally, ASEPSoftware can be used for detecting some or all of invalid operations. Optionally, ASEPSoftware can use a peripheral device other than the ASEPDevice for detecting invalid operations.

The set of operations supported by an ASEPDevice is implementation specific. But all ASEPDevices must support one or more Application Security Environments and one or more states for each Application Security Environment.

Some ASEPDevices may allow the ASEPManualAction to also select the user who is performing that ASEPManualAction. In this case, a user name or a user identifier is also placed into registers/memory readable (but not writable) by the computer to which the ASEPDevice is attached.

Figure 3:
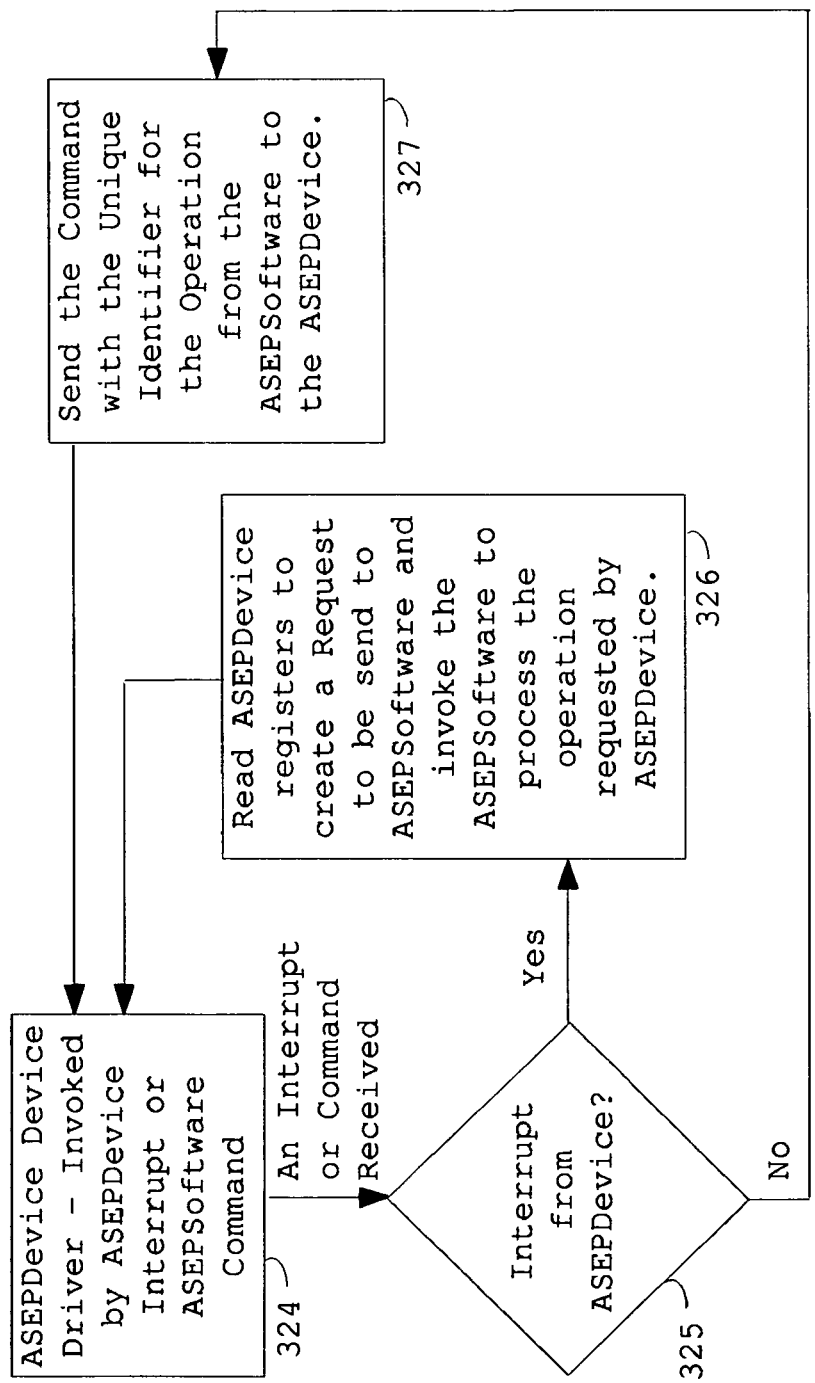
FIG. 3 illustrates an example of a state machine of an ASEPDevice device driver that controls an ASEPDevice.

FIG. 3 illustrates an example of a state machine of an ASEPDevice device driver. The ASEPDevice device driver awaits 324 an interrupt from an ASEPDevice or a command from ASEPSoftware. The ASEPDevice device driver checks 325 whether it got invoked due to an interrupt or due to a command sent by the ASEPSoftware. When an interrupt is received from the ASEPDevice 326, the device driver reads ASEPDevice registers and memory to create a request to be passed to the ASEPSoftware. Then it invokes the ASEPSoftware to process the request. When the ASEPSoftware invokes 327 the ASEPDevice device driver by sending a command, the driver sends the command to ASEPDevice by writing into the ASEPDevice registers/memory.

An ASEPDevice device driver may control one or more ASEPDevices. There could be one or more ASEPDevice device drivers running on a computer, each controlling a mutually exclusive set of ASEPDevices.

Preferably, most of the ASEPSoftware should be part of the operating system.

Figure 4:
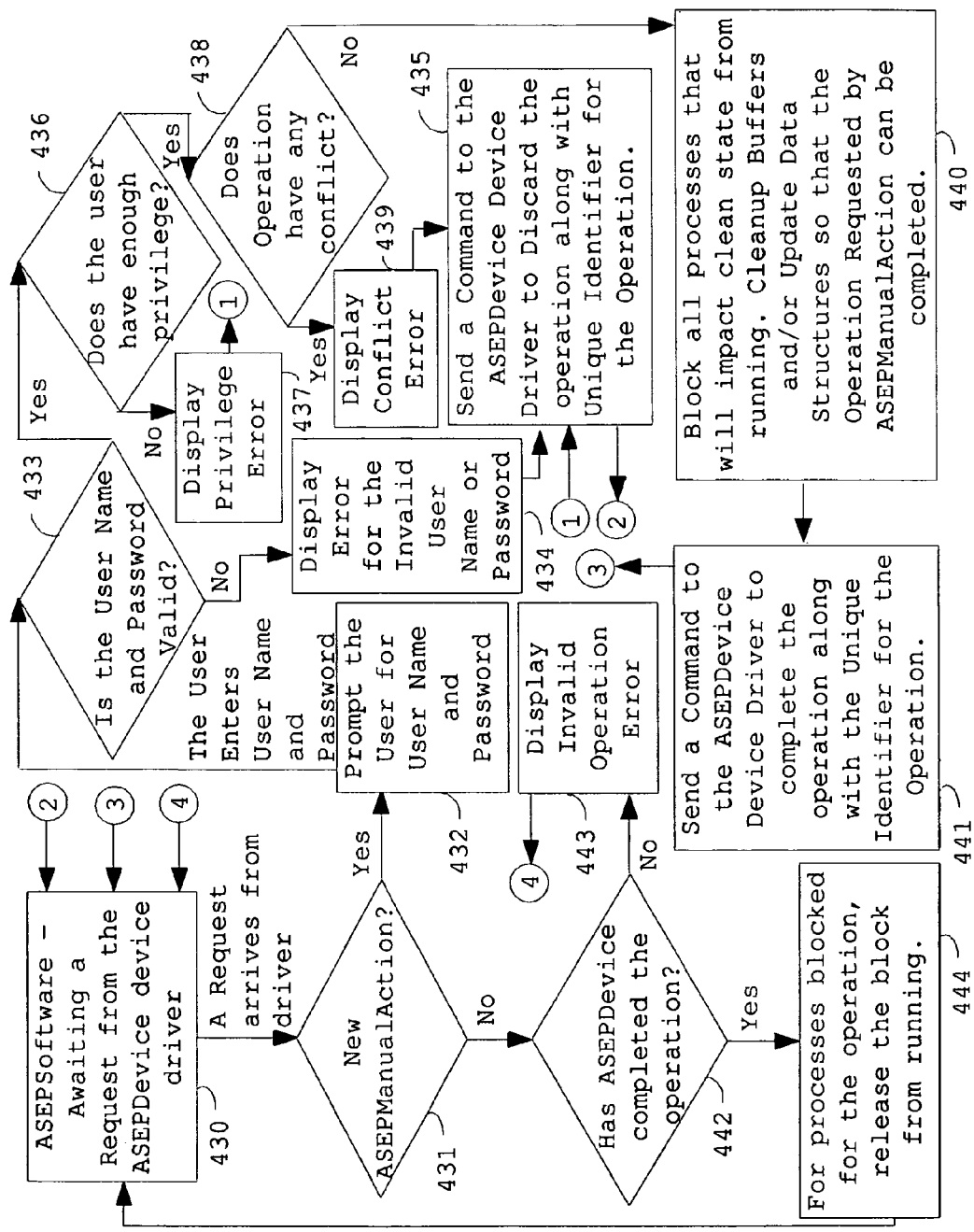
FIG. 4 illustrates an example of a state machine of ASEPSoftware which processes requests from an ASEPDevice device driver.

FIG. 4 illustrates an example of a state machine of the ASEPSoftware that processes requests from an ASEPDevice device driver. The ASEPSoftware 430 awaits requests from the ASEPDevice device driver. When a request from the ASEPDevice device driver arrives, the ASEPSoftware checks whether the request is for an operation corresponding to a new ASEPManualAction 431. If the request is for an operation corresponding to a new ASEPManualAction, the ASEPSoftware prompts 432 the user who performed the ASEPManualAction for the user name and password. When the user enters the user name and password, the user name and password are validated 433. If the validation fails, the ASEPSoftware displays an error message 434, sends a command 435 along with the unique identifier for the operation to the ASEPDevice device driver to discard the operation and goes back to the state where it awaits a new request from the ASEPDevice device driver. If the user name and password are valid, the ASEPSoftware checks whether the user has the privilege 436 to perform the operation requested by the ASEPManualAction. If the user does not have required privilege, the ASEPSoftware displays an error message 437 and sends a command 435 along with the unique identifier for the operation to the ASEPDevice device driver to discard the operation and goes back to the state where it awaits a new request from the ASEPDevice device driver. If the user has the privilege to perform the operation requested by the ASEPManualAction, the ASEPSoftware checks whether the requested operation has any conflict 438 with any of the ongoing operations. If there is a conflict, the ASEPSoftware displays an error message 439 and sends a command 435 along with the unique identifier for the operation to the ASEPDevice device driver to discard the operation and goes back to the state where it awaits a new request from the ASEPDevice device driver. If the operation requested does not have any conflict with ongoing operations, the ASEPSoftware performs the cleanup 440 required to perform the operation including cleaning up of buffers and updating data structures as required. As part of the cleanup, all processes that will impact the clean state are blocked from running 440. The ASEPSoftware may interact with other operating system modules to get the required cleanup completed. After the clean up is completed, ASEPSoftware sends a command 441 to the ASEPDevice device driver with the unique identifier for the operation so that the ASEPDevice can perform the operation. In this state 441, ASEPSoftware does not release the not-ready-to-run state for processes that will impact the clean state. If the request from the ASEPDevice device driver is not for a new ASEPManualAction 442, ASEPSoftware checks whether the ASEPDevice has completed an operation. When an operation is completed. 444, for all the processes that were blocked from running for that operation to complete, the ASEPSoftware releases the block and goes back to the state where it awaits a new request from the ASEPDevice device driver. If the request from the ASEPDevice device driver is to indicate that a user entered an invalid operation 443, the ASEPSoftware displays an error message and goes back to the state where it awaits a new request from ASEPDevice device driver.

The ASEPSoftware could consist of different components such as configuration commands, a software module to prompt for, accept and authenticate the user name and password, operating system modules that create/delete/update data structures and configuration for users, user groups, Application Security Environments, Application Security Environment States and Application Security Environment State Mappings.

If the operation requested by an ASEPManualAction is to delete a user, preferably, all the processes/tasks owned by the user will be terminated and all data structures for the Applicable Environments for the user will be deleted as part of the cleanup. If the operation requested by ASEPManualAction is to delete an Application Security Environment, preferably, all the processes/tasks in the Application Security Environment will be terminated as part of the clean up. If the operation requested by ASEPManualAction is to delete a state of an Application Security Environment and if the current state of the Application Security Environment is same as the state being deleted, it is considered an invalid operation. If the operation requested is a change of Application Security Environment State, all processes/tasks in that Application Security Environment must be prevented from running and those processes/tasks are allowed to run again only after the state change is completed by the ASEPDevice. A process or a task could be blocked for more than one operation to complete and it will be allowed to run only after all those operations are complete. If the operation requested by an ASEPManualAction is to lower the privileges corresponding to a user or a user group, then the set of privileges corresponding to the Application Security Environment States of the Application Security Environments which are owned by that user or that user group will be also be lowered accordingly, by ANDing with the new set of privileges for the user or the user group.

Optionally, when an operation requested by an ASEPManualAction is to delete a user and if that user has processes/tasks which are active, the operation can be discarded as a conflicting operation.

There could be different behaviors while accepting passwords. If the user-name/password entered by a user is invalid, the ASEPSoftware could prompt the user for user-name/password again and accept a new user-name/password from the user until a valid user-name/password is received or until the maximum number of password retries is reached or until the user cancels the request to reenter the password. The ASEPDevice that supports user-name/password retries, will send the command to discard an operation corresponding to an ASEPManualAction only if a valid user-name password is not received even after the maximum number of user-name/password retries or if the user cancels the password retry.

When the ASEPSoftware is used with an ASEPDevice that allows an ASEPManualAction to select the user of the ASEPDevice (the user performing ASEPManualAction), the ASEPSoftware needs to prompt for and accept only the user's password. The ASEPSoftware in this case can allow password retries.

If an ASEPDevice allows an ASEPManualAction to select the user of the ASEPDevice, then the ASEPDevice may be also able to determine whether the user has enough privilege to perform the operation requested by an ASEPManualAction.

The method used by an ASEPDevice for authenticating a user using a user-name/password or password is implementation specific.

An ASEPSoftware may use other options for validating a user, such as finger print validation, retina validation, other current and future technologies for user authentication. An ASEPSoftware may also use a combination of two or more methods of user authentication such as password validation, finger print validation, retina validation, etc., for authenticating the user who performed an ASEPManualAction. The method used by an ASEPDevice for authenticating a user is implementation specific.

Some ASEPSoftware may use a timeout while performing user authentication. In this case, the ASEPSoftware will fail the user authentication and will send a command to the ASEPDevice to discard the operation after the timeout expires.

The order in which the validation of an operation, the user authentication for an operation, the check to verify whether the user has sufficient privileges to do the operation and the check to detect/resolve whether the operation has conflict with any ongoing operations are done, is implementation specific.

The ASEPSoftware may use different strategies to resolve conflict between a new operation and an ongoing operation such as queuing all new requests that have a conflict with an ongoing operation and using different levels of priority. If operations have priorities and if a conflicting low priority operation is in a state where it can be stopped, a new high priority operation can result in an ongoing operation to be marked to be stopped and the high priority operation can be kept pending until the ongoing operation is stopped. The strategy used for resolving conflict between ongoing operations and a new operation is implementation specific.

As part of cleanup all processes/tasks that will affect the clean state required for the operation must be stopped from running.

Examples of operations that require cleanup/update by an ASEPSoftware are the creation/deletion of one or more users or user groups or Application Security Environments or Application Security Environment States or adding/deleting one or more users to or from a user group or changing the state corresponding to an Application Security Environment or changing the privileges of a user or a user group or modifying the Application Security Environment State Mappings for the current Application Security Environment State.

In order to protect data on mass-memories, the mass-memories are divided into Regions and read or write access to each Region is controlled for each user and each user group. Privileged users limit read or write access to each user or group to these Regions as proposed in U.S. patent applications Ser. Nos. 11/514807, 11/515619 and 11/519178. Users can further limit access to each Application Security Environment owned by them. These limits are applied in addition to restrictions applied at file system level.

File systems and raw disk access system calls can tag each read or write operation with the identifier of the Application Security Environment from which the file operation or raw disk access is attempted. Each buffer in a buffer cache in a file system is tagged similar to the proposal in U.S. patent applications Ser. Nos. 11/514807, 11/515619 and 11/519178. Each buffer can have multiple tags and each tag corresponds to an Application Security Environment. When a file operation done by a process/task maps to a buffer in the buffer cache, the file system checks whether the Application Security Environment already has an Application Security Environment tag to that buffer. If the Application Security Environment tag exists, the file system checks whether the operation requested by the file operation is permitted by the tag. If the file operation is not permitted, the file system returns an error to the process/task that requested the operation. If the Application Security Environment tag exists and the tag allows the file operation, the read or write to the buffer is allowed to proceed. If the Application Security Environment tag does not exist, the file system calls an ASEPImplementer with the identifier for the Application Security Environment and an identifier for the Region of the mass-memory.

The ASEPImplementer checks the ASEPDevice registers/memory corresponding to the Region of the mass-memory and the Application Security Environment and creates an Application Security Environment tag. The Application Security Environment tag is returned to the file system. The file system adds the tag to the buffer and verifies whether the operation requested is permitted by the tag. If the Application Security Environment tag does not permit the requested operation, an error is returned to the process/task. If the Application Security Environment tag permits the operation, the operation is allowed to continue. If the buffer requested by a file operation does not exist, the file system gets an Application Security Environment tag for the buffer from the ASEPImplementer. If the operation is permitted, the file system creates a new buffer in its buffer cache, adds the Application Security Environment tag to the buffer and if required, creates a mass-memory read request for the buffer along with the tag. A mass-memory read request is required if the buffer is being read or is being partially written by the process/task. If the operation is not permitted by the Application Security Environment tag, an error is returned to the process/task and no new buffer will be created. The Application Security Environment tag is passed to storage components below the file system along with mass-memory read or write requests similar to the proposal in U.S. patent applications Ser. Nos. 11/514807, 11/515619 and 11/519178.

Before the state of an Application Security Environment can be changed, as part of cleanup, all the tags for that Application Security Environment should be removed from the buffers in the buffer cache in a file system. Similar cleanup will be required in all file systems in the operating system.

Similar cleanup is required when an Application Security Environment or an ASEO is deleted or when privileges of ASEO is changed or when privileges corresponding to the current state of an Application Security Environment is modified.

There are different options for restarting processes/tasks which are blocked for cleanup. One option is to configure the ASEPDevice to generate an interrupt when an operation completes as shown in the examples. The processes/tasks in the Application Security Environment are blocked from executing until the interrupt is processed by the operation system. Another option is to use a timeout for an operation to complete and processes/tasks in the Application Security Environment are blocked from execution during timeout period. If the operation does not complete during the timeout period, the user who initiated the ASEPManualAction can either abort the operation or initiate another timeout. This is not a recommended option. A third option is to use both the timeout and the interrupt for keeping the Application Security Environment in a clean state until state change is completed.

If the configuration is not kept in the ASEPDevices, validity of an operation will have to be verified by the ASEPSoftware. In this case, if the operation is invalid as per the configuration, the ASEPSoftware will send a command to the ASEPDevice to discard the operation.

ASEPImplementers are computer software modules that implement access protection using ASEPDevice/s and create Application Security Environment tags for file systems. Preferably, all or most of the ASEPImplementers should be part of operating system.

Figure 5:
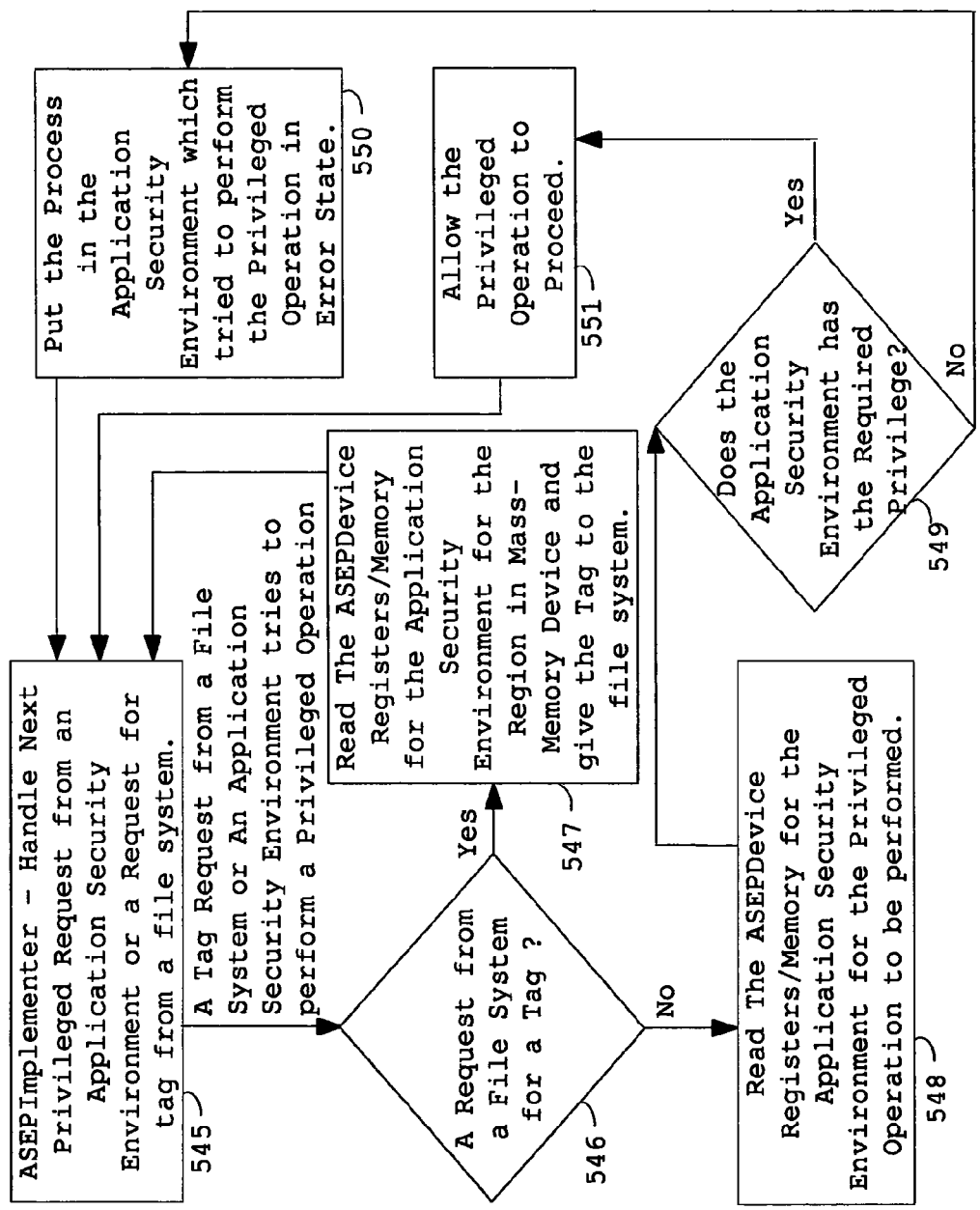
FIG. 5 illustrates an example of a state machine of an ASEPImplementer that implements access restrictions for Application Security Environments using ASEPDevice.

FIG. 5 illustrates an example of a state machine of an ASEPImplementer. The ASEPImplementer gets invoked 545 when a process or a task or a thread attempts to do a privileged operation or when a file system requests an Application Security Environment tag. The ASEPImplementer checks 546 whether it was invoked by a request from a file system for a tag. If it is a request from a file system 547, the ASEPImplementer reads read-only ASEPDevice registers/Memory corresponding to the Application Security Environment and Region of mass-memory to create the tag. The tag is sent 547 to the file system and the ASEPImplementer returns. If the request is not a tag request from a file system, the ASEPImplementer checks 549 whether the process/task/thread that is attempting to do a privileged operation has the privilege to perform the privileged operation by reading 548 read-only registers/memory corresponding to the requested privileged operation for the Application Security Environment, in which the process or task or thread is executing. If the Application Security Environment has the privilege 551 to perform the privileged operation in its current state, the process/task/thread is allowed to perform the privileged operation. If the Application Security Environment does not have the privilege 550 to perform the operation in its current state, the process/task/thread that attempted to do the privileged operation is placed in an error state and the ASEPImplementer returns. Handling of the process/task/thread in error state is done by the operating system.

If there is no configuration present for a privileged operation which is attempted by a process/task/thread in an Application Security Environment such as when there is no Application Security Environment State Mapping for the current Application Security Environment State or when there are no states defined for an Application Security Environment, preferably, ASEPImplementers must be configured to block the privileged operation. There could be some ASEPImplementers that are configured to allow the privileged operation when there is no configuration.

The ASEPImplementer may be designed such that it places an application in an error state when a process or a task or a thread in an application requests a privileged operation which is not allowed by the current state of the Application Security Environment. The way an ASEPImplementer handles an authentication failure is implementation specific.

Figure 6:
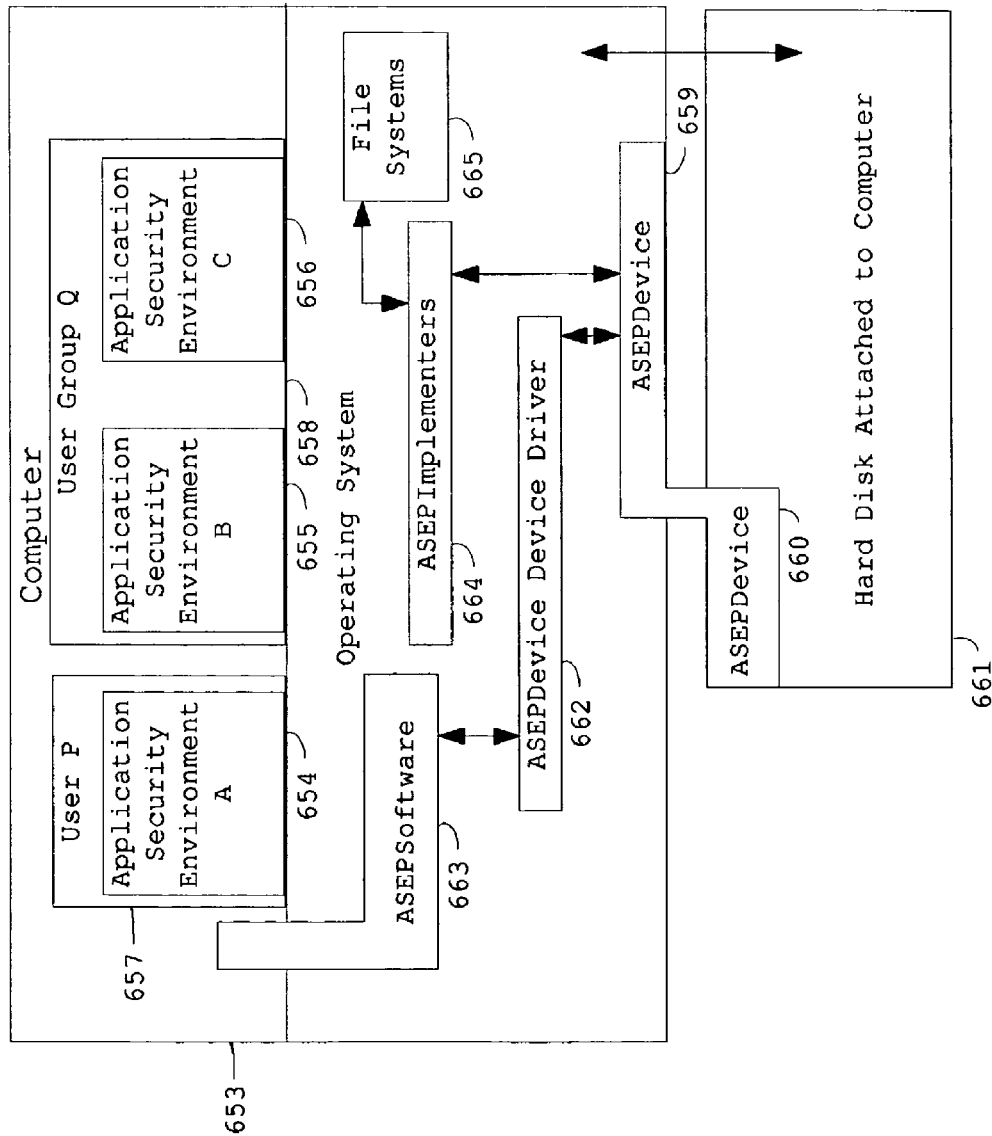
FIG. 6 illustrates an example of how different components in a computer interact when used with an ASEPDevice that accepts ASEPManualActions.

FIG. 6 illustrates an example of a computer 653 that implements access protection using an ASEPDevice. The computer has Application Security Environment A 654 which is owned by User P 657 and Application Security Environments B 655 and C 656 which are owned by User Group Q 658. An ASEPDevice 659 is attached to the computer 653. Part 660 of the ASEPDevice 659 is embedded in a hard disk 661 attached to the computer so that disk firmware can read ASEPDevice registers and memory without interacting with the computer or a link external to the disk. The ASEPDevice 659 is controlled by an ASEPDevice device driver 662. The ASEPDevice device driver 662 passes requests from ASEPDevice 659 to the ASEPSoftware 663 and commands from the ASEPSoftware 663 to the ASEPDevice 659. Most of the ASEPSoftware is part of the operating system. A part of the software which prompts the user for user-name and password is not part of the operating system in this example. ASEPImplementers 664 enforce access control by reading the ASEPDevice 659 registers/memory. File systems 665 interact with the ASEPImplementers 664 to get Application Security Environment tags.

ASEPImplementers can use ASEPDevice device driver interfaces for reading ASEPDevice registers/memory.

There are different ways to distribute functionality between ASEPDevices and ASEPSoftware. Optionally, ASEPSoftware can be used to verify whether an operation requested through an ASEPManualAction action is valid. In this case, when an operation is not valid, ASEPSoftware can send a command to the ASEPDevice to discard the operation. Similarly, an ASEPDevice can be used to verify whether there is a conflict between a new operation requested by an ASEPManualAction and an ongoing operation. The distribution of functionality between ASEPSoftware and ASEPDevices is implementation specific.

Figure 7:
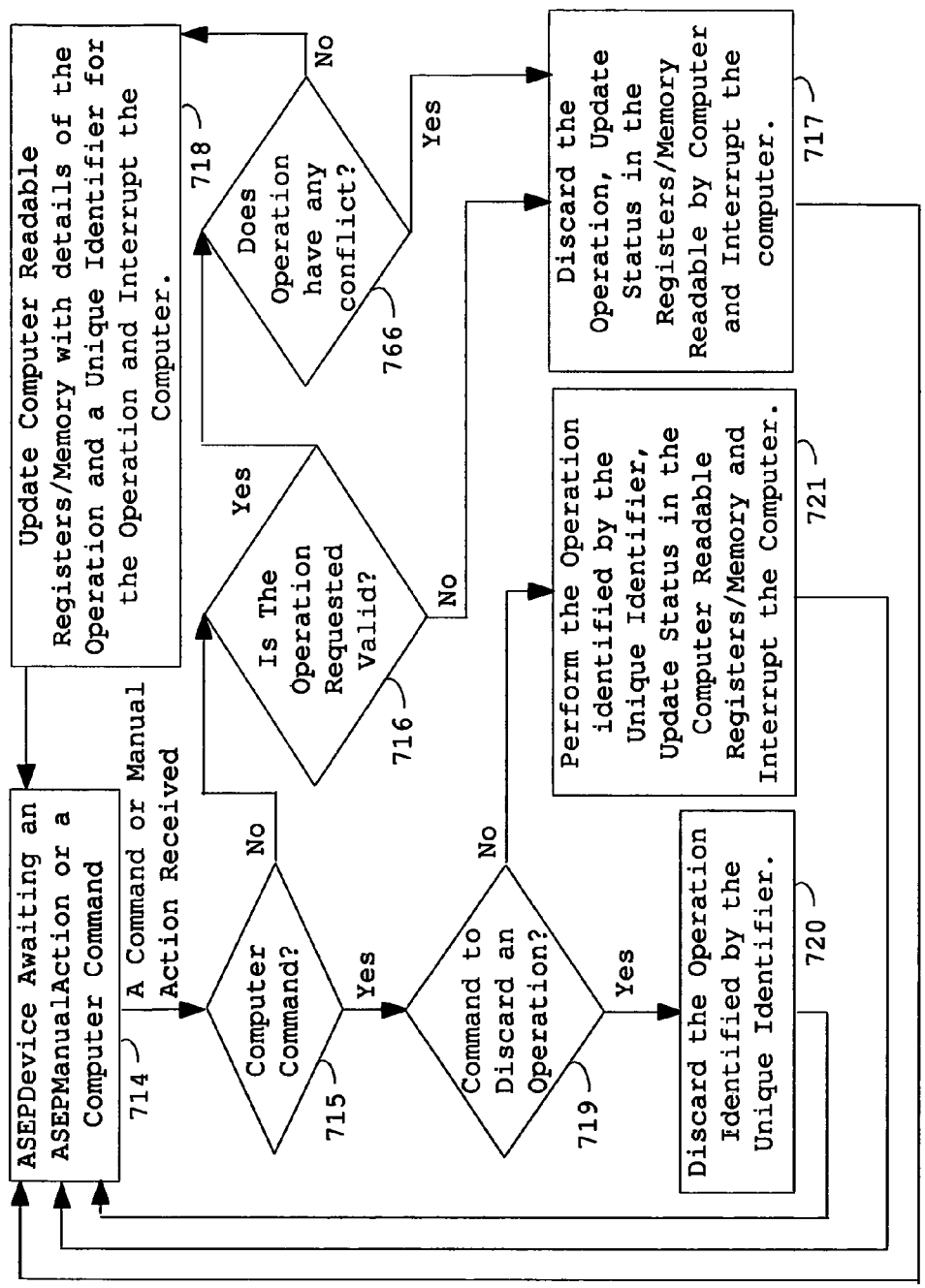
FIG. 7 illustrates an example of a state machine of an ASEPDevice that handles conflicts between operations.

FIG. 7 illustrates an example of a state machine of an ASEPDevice that handles conflicts between operations. The configuration for users/user groups/Application Security Environments/Application Security Environment States is stored in this ASEPDevice and hence the firmware on the ASEPDevice can determine whether an operation requested by an ASEPManualAction is valid or not. The ASEPDevice awaits 714 an ASEPManualAction from a user or a Computer Command from the computer to which it is attached. The ASEPDevice checks the type of input 715, whether an ASEPManualAction or a Computer Command is received. When a user performs an ASEPManualAction, the ASEPDevice checks 716 whether the operation requested through the ASEPManualAction is valid. If the operation requested is invalid 717, the ASEPDevice discards the operation, updates registers/memory readable (but not writable by the computer) by the computer to indicate the discarded operation and the reason for discarding the operation and interrupts the computer to which it is attached. If the operation is valid 766, the ASEPDevice checks whether the operation requested through the ASEPManualAction has conflict with any of the ongoing operations. If the operation requested has conflict 717 with any of the ongoing operations, the ASEPDevice discards the operation, updates registers/memory readable (but not writable by the computer) by the computer to indicate the discarded operation and the reason for discarding the operation and interrupts the computer to which it is attached. If a valid operation requested through the ASEPManualAction does not have any conflicts with any of the ongoing operations 718, the ASEPDevice updates Computer Readable (but not computer writable) Registers/Memory with details of the operation requested through the ASEPManualAction and a unique identifier for the operation and interrupts the computer to which it is attached. When a Computer Command is received, the ASEPDevice checks 719 whether the command is to discard or perform an operation. If the command is to discard an operation 720, the ASEPDevice discards the operation identified by the unique identifier. If the command is to perform an operation, the ASEPDevice performs 721 the operation identified by the unique identifier, updates registers/memory readable (but not writable) by the computer with the status and results of the operation and interrupts the computer to which it is attached.

There are different algorithms for resolving conflicts between operations in an ASEPDevice, such as priorities, queuing until all prior conflicting operations are completed, etc.

Algorithms used in ASEPDevices for resolving conflict can use priorities for operations. For example, when a privileged user has initiated a high priority operation and if one conflicting operation is ongoing, the ongoing operation can be marked as inactive and the high priority operation can be kept pending. The inactive operation is discarded and the pending operation is sent to the ASEPDevice device driver by the ASEPDevice as soon as the ASEPDevice device driver sends a command to the ASEPDevice to discard or complete the inactive operation. When an operation is discarded, the computer to which the ASEPDevice is attached, is notified using an interrupt. If the ASEPSoftware has done any cleanup for a discarded operation, part of the cleanup may have to be rolled back depending on the operation. Preferably, only one high priority operation can be kept pending and all other high priority operations are discarded. There are different ways to resolve conflicts between operations based on priorities.

The algorithm used in an ASEPDevice for resolving conflict between new and ongoing operations is implementation specific.

Figure 8:
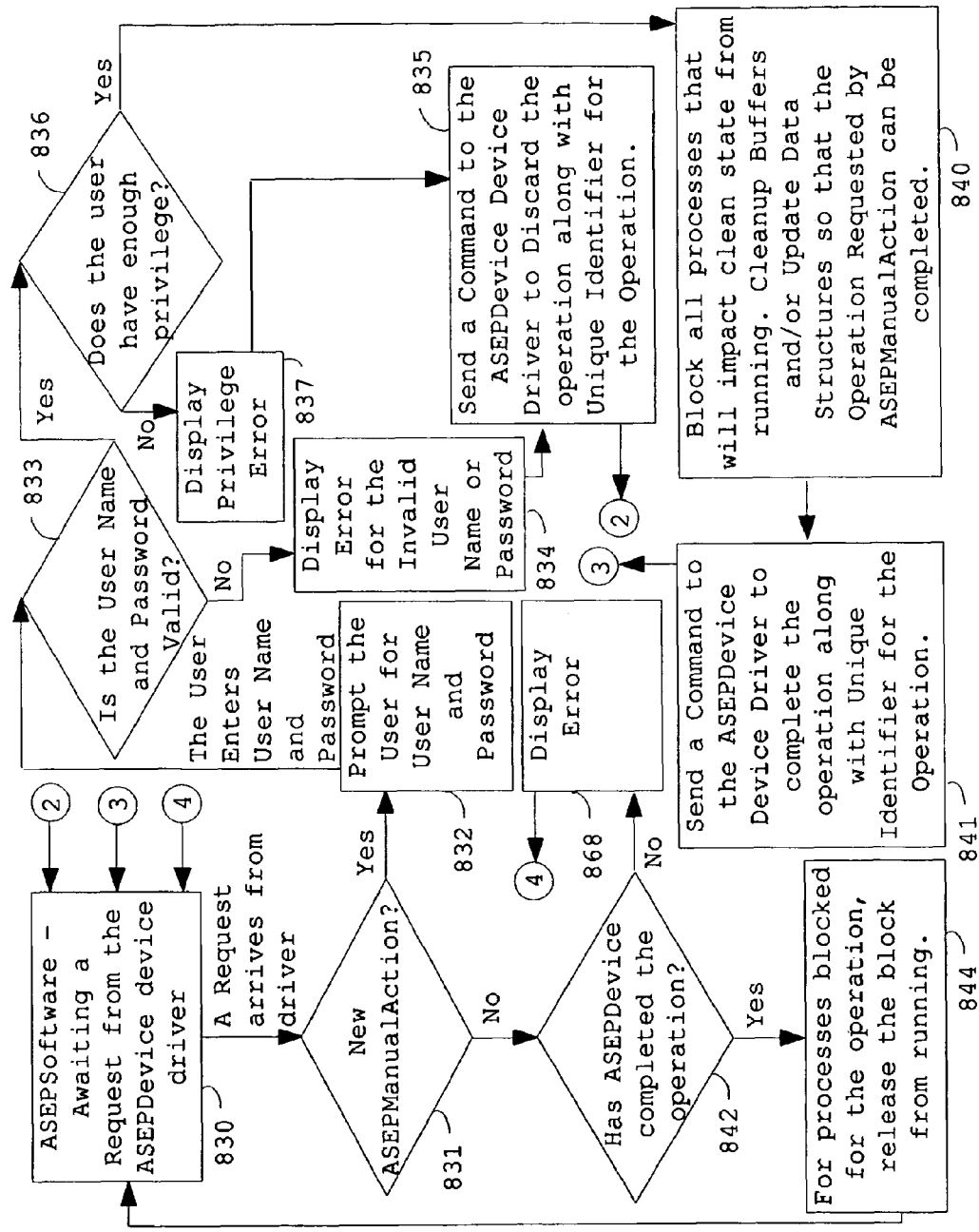
FIG. 8 illustrates an example of a state machine of an ASEPSoftware that can be used with an ASEPDevice that handles conflicts between operations.

FIG. 8 illustrates an example of a state machine of an ASEPSoftware that can be used with an ASEPDevice that handles conflicts between operations. ASEPSoftware 830 awaits requests from the ASEPDevice device driver. When a request from the ASEPDevice device driver arrives, the ASEPSoftware checks whether the request is for an operation corresponding to a new ASEPManualAction 831. If the request is for an operation corresponding to a new ASEPManualAction, the ASEPSoftware prompts 832 the user who performed the ASEPManualAction for user name and password. When the user enters the user name and password, the user name and password are validated 833. If the validation fails, the ASEPSoftware displays an error message 834, sends a command 835 along with the unique identifier for the operation to the ASEPDevice device driver to discard the operation and goes back to the state where it awaits a new request from the ASEPDevice device driver. If the user name and password are valid, the ASEPSoftware checks whether the user has the privilege 836 to perform the operation requested by the ASEPManualAction. If the user does not have the required privilege, the ASEPSoftware displays an error message 837 and sends a command along with the unique identifier for the operation to the ASEPDevice device driver to discard 835 the operation and goes back to the state where it awaits a new request from the ASEPDevice device driver. If the user has the privilege to perform the operation requested by the ASEPManualAction, the ASEPSoftware performs the cleanup 840 required to perform the operation including cleaning up of buffers and updating data structures as required. As part of the cleanup, all processes that will impact the clean state are blocked from running 840. The ASEPSoftware may interact with other operating system modules to get the required clean up completed. After the clean up is completed, the ASEPSoftware sends a command 841 to the ASEPDevice device driver with the unique identifier for the operation so that the ASEPDevice can perform the required operation. In this state 841, the ASEPSoftware does not release the not-ready-to-run state for processes that impact the clean state. If the request from the ASEPDevice device driver is not for a new ASEPManualAction 842, ASEPSoftware checks whether the ASEPDevice has completed an operation. When an operation is completed 844, for all the processes that were blocked from running for that operation to complete, the ASEPSoftware releases the block and goes back to the state where it awaits a new request from the ASEPDevice device driver. If the request from the ASEPDevice device driver is to indicate that a user entered an invalid/conflicting operation, the ASEPSoftware displays an error message 868 corresponding to the error reported in status registers and goes back to the state where it awaits a new request from the ASEPDevice device driver.

There could be one or more ASEPDevices in a computer, each controlling states corresponding to a mutually exclusive set of Application Security Environments or controlling Application Security Environments owned by mutually exclusive set of users/user-groups or controlling mutually exclusive set of privileges. Some implementations may use more than one ASEPDevices on the same computer, each controlling states corresponding to sets of Application Security Environments which are not mutually exclusive, but we do not recommend such implementations.

Parts of an ASEPDevice could be embedded in different peripheral or mass-memory devices attached to a computer, such as disks. In this case, a mass-memory device controller can implement privileges based on the current state of the Application Security Environments. This will significantly improve security for mass-memories attached to computers as a malicious user will not be able to copy data from these mass memory devices even if they are stolen.

Optionally, the access restrictions associated with each state of an Application Security Environment is independent of access restrictions associated with other states of the same Application Security Environment. Preferably, access restrictions are such that there are dependencies between access restrictions corresponding to some or all of the states corresponding to an Application Security Environment. This could be achieved by using a bit map as a state where each bit corresponds to a set of privileges and the privileges are enabled or disabled depending on whether the corresponding bit is one or zero. Optionally, the access restrictions for the next state can be created by ANDing or ORing the access restrictions corresponding to the previous state with the access restrictions corresponding to a new selection. Hence, access restrictions may have dependencies on previous states.

Optionally, every process or task or thread can belong to a separate Application Security Environment. In this case, a process identifier or a task identifier or a thread identifier could be used to uniquely identify an Application Security Environment. This may require a user to identify an available process or task identifier, create an Application Security Environment having this identifier and then create a process or task in this Application Security Environment with the same identifier. This implementation requires an operating system that allows a user to select process or task identifiers.

Optionally, an ASEPDevice is such that it allows ASEPManualAction to change the privileges of an Application Security Environment and does not use Application Security Environment States.

Optionally, there should be an option for users to set a timeout for an ASEPManualAction. At the end of the timeout, if the operation has not been completed, then the user may either let the operation continue or abort the operation.

When an operation requested by a process or task or thread in an Application Security Environment is not permitted by the current state of that Application Security Environment, the process or the task or the thread that attempted to do that privilege operation is put in an error state. The operating system will take appropriate action such as terminating the process or task depending on the error.

Preferably, all or part of the code for the ASEPSoftware, the ASEPImplementers, file system components that use Application Security Environment tags and ASEPDevice device drivers should be kept in Read-Only memory or in memory pages which are write protected to further improve protection. The write protected memories may be a ROM or may be pages or areas of memories marked not writable by an operating system loader; No software including the operating systems running on the computer or an external device can change the write protection status for these pages or areas of memories or write into these pages or areas of memories.

Some of the access protection in a computer which is attached to one or more ASEPDevices may be implemented by software other than ASEPImplementers.

Preferably, the configuration corresponding to a user or a user group can be fetched using the identifier of the user or the user group. Similarly, the configuration corresponding to an Application Security Environment can be fetched using the identifier of the Application Security Environment. If the device that stores the configuration is a memory or mass-memory device, it is preferable to have a mapping from the identifier of the user/user-group/Application Security Environment to the memory address where the corresponding configuration is stored.

The next state requested by an operation can be hidden from the computer to which an ASEPDevice is attached until the operation is completed. To change the state corresponding to an Application Security Environment, the ASEPDevice can update computer readable registers/memory (which preferably are not writable by the computer) with the identifier of the Application Security Environment, an identifier to identify the state change operation and a unique identifier for the operation and interrupt the computer using a hardware interrupt. Since the new state requested by the ASEPManualAction is not communicated to the computer, no malicious software can control the state of the ASEPDevice corresponding to an Application Security Environment.

The configuration can be kept in ASEPDevice registers/memory which are not writable by computer to which an ASEPDevice is attached. Since the configuration is kept in registers/memory not writable by software, no malicious software can modify the configuration. This way, highly secure Application Security Environments can be created.

Optionally, an Application Security Environment State corresponds to a set of privileges that the processes/tasks running in the Application Security Environment have while that Application Security Environment is in that state. In this case, an Application Security Environment State is virtual and it is the same as the privileges that the processes/tasks running in the Application Security Environment have while that Application Security Environment is in that state.

Optionally, the effective state of an Application Security Environment can be a combination of the state of a user as proposed in US patent applications 11/514807, 11/515619 and 11/519178 and a state of an Application Security Environment.

Optionally, the privileges corresponding to an Application Security Environment can be obtained by ANDing the privileges corresponding to a user state and the privileges corresponding to an Application Security Environment State.

Optionally, where privileges are a function of user state, an Application Security Environment can have a fixed set of privileges and need not have multiple states.

Optionally, the configuration can be such that an Application Security Environment State Mapping identifies a set of access restrictions or lack of privileges that the processes/tasks running in an Application Security Environment have while that Application Security Environment is in that state.

Optionally, the configuration can be such that an Application Security Environment State Mapping identifies a set of both privileges and access restrictions that the processes/tasks running in the Application Security Environment have while that Application Security Environment is in that state.

What is claimed is:

1. A first apparatus implemented in hardware which is used for implementing access protection for applications running in a second apparatus, said first apparatus comprising:
    (a) a mechanism to accept a first manual action to delete a first application security environment in said second apparatus, wherein an application security environment is an environment in which at least one application is run, wherein privileges of an application security environment are applied to applications running in that application security environment;
    (b) a mechanism which allows a device driver running in said second apparatus to read information about said first manual action to delete said first application security environment;

(c) a mechanism to accept a first command from said second apparatus to delete said first application security environment;

(d) a mechanism to delete said first application security environment;

(e) a mechanism to store list of application security environments in said second apparatus;

(f) a mechanism to prevent software from modifying said list of application security environments by keeping said list of application security environments not writable by said software, wherein said software runs on any apparatus other than said first apparatus; and (g) a mechanism to couple said first apparatus to said second apparatus.

2. The first apparatus of claim 1 further comprising: a mechanism to accept a second manual action to create a second application security environment in said second apparatus.

3. The first apparatus of claim 2 further comprising: a mechanism to accept a second command from said second apparatus to create said second application security environment in said second apparatus.

4. The first apparatus of claim 2 further comprising: a mechanism to accept a third manual action to create a plurality of application security environments, wherein said plurality of application security environments does not include said first application security environment and said second application security environment.

5. The first apparatus of claim 2 further comprising: a mechanism to accept a fourth manual action to delete a plurality of application security environments, wherein said plurality of application security environments does not include said first application security environment and said second application security environment.

6. The first apparatus of claim 2 further comprising: a mechanism to update registers or memory readable by said second apparatus with an identifier of a user who performed said first manual action to delete said first application security environment.

7. The first apparatus of claim 2 comprising: said mechanism to store said list of application security environments in said second apparatus, wherein said list is stored in registers in said first apparatus.

8. The first apparatus of claim 7 comprising: said mechanism to prevent software from modifying said list of application security environments, wherein said mechanism prevents software from writing to said registers.

9. The first apparatus of claim 2 further comprising: said mechanism to store said list of application security environments in said second apparatus, wherein said list is stored in memory in said first apparatus.

10. The first apparatus of claim 9 comprising: said mechanism to prevent software from modifying said list of application security environments, wherein said mechanism prevents software from writing to said memory.

11. The first apparatus of claim 2 further comprising: a mechanism for accepting a fifth manual action for creating and deleting users.

12. The first apparatus of claim 11 further comprising: a mechanism for accepting a sixth manual action for creating and deleting groups of users.

13. The first apparatus of claim 2 further comprising: a mechanism for accepting a seventh manual action for creating at least one state of an application security environment and a mapping between said state of said application security environment and privileges of applications running in said application security environment when said application security environment is in said state.

14. The first apparatus of claim 2 further comprising: a mechanism for interrupting said second apparatus when said first manual action to delete said first application security environment is received.

15. The first apparatus of claim 2 further comprising: a mechanism for accepting an eighth manual action for dividing at least one mass memory into regions, wherein said first apparatus is used for implementing access control to said regions of said mass memory.

16. The first apparatus of claim 15, wherein said first apparatus is enclosed in an enclosure, wherein said mass memory which is being access protected by said first apparatus is also enclosed in said enclosure.

17. The first apparatus of claim 15 being used by mass memory device controller of said mass memory for implementing access protection.

18. A first apparatus implemented in hardware which is used for implementing access protection for applications running in a second apparatus, said first apparatus comprising:

(a) a mechanism to accept a first manual action from a first user to delete a second user in said second apparatus;

(b) a mechanism which allows a device driver running in said second apparatus to read information about said first manual action to delete said second user;

(c) a mechanism to accept a first command from said second apparatus to delete said second user;

(d) a mechanism to delete said second user;

(e) a mechanism for storing list of users of said second apparatus;

(f) a mechanism to prevent software from modifying said list of users by keeping said list of users not writable by said software, wherein said software runs on any apparatus other than said first apparatus; and (g) a mechanism to couple said first apparatus to said second apparatus.

19. The first apparatus of claim 18 further comprising: a mechanism to accept a second manual action to create a third user.

20. The first apparatus of claim 19 further comprising: a mechanism to accept a second command from said second apparatus to create said third user.

21. The first apparatus of claim 19 further comprising: a mechanism to update registers or memory readable by said second apparatus with an identifier of said first user.

22. The first apparatus of claim 19 comprising: said mechanism for storing said list of users, wherein said list of users is stored in registers in said first apparatus.

23. The first apparatus of claim 22 comprising: said mechanism to prevent said software from modifying said list of users, wherein said mechanism prevents said software from writing to said registers in said first apparatus.

24. The first apparatus of claim 19 further comprising: said mechanism for storing said list of users, wherein said list of users is stored in memory in said first apparatus.

25. The first apparatus of claim 24 further comprising: said mechanism to prevent said software from modifying said list of users, wherein said mechanism prevents said software from writing to said memory in said first apparatus.

26. The first apparatus of claim 19 further comprising: a mechanism for accepting a third manual action for creating a plurality of users, wherein said plurality of users does not include said first user and said second user.

27. The first apparatus of claim 19 further comprising: a mechanism for accepting a fourth manual action for creating and deleting groups of users.

28. The first apparatus of claim 19 further comprising: a mechanism for accepting a fifth manual action for creating at least one state of an application security environment and a mapping between said state of said application security environment and privileges of applications running in said application security environment when said application security environment is in said state, wherein an application security environment is an environment in which at least one application is run, wherein privileges of an application security environment are applied to applications running in that application security environment.

29. The first apparatus of claim 19 further comprising: a mechanism for interrupting said second apparatus when said first manual action to delete said second user is received.

30. The first apparatus of claim 19 further comprising: a mechanism for accepting a sixth manual action for dividing at least one mass memory into regions, wherein said first apparatus is used for implementing access control to said regions of said mass memory.

31. The first apparatus of claim 30, wherein said first apparatus is enclosed in an enclosure, wherein said mass memory which is being access protected by said first apparatus is also enclosed in said enclosure.

32. The first apparatus of claim 30 being used by mass memory device controller of said mass memory.

* * * * *